US011405285B2

(12) United States Patent
Keppler et al.

(10) Patent No.: US 11,405,285 B2
(45) Date of Patent: **\*Aug. 2, 2022**

(54) CYBER-PHYSICAL SYSTEM EVALUATION

(71) Applicant: The MITRE Corporation, McLean, VA (US)

(72) Inventors: David Keppler, Herndon, VA (US); Robert L. Haverkos, Reston, VA (US); James R. Morris-King, Acton, MA (US)

(73) Assignee: The MITRE Corporation, McLean, VA (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/941,922

(22) Filed: Jul. 29, 2020

(65) Prior Publication Data

US 2020/0358661 A1    Nov. 12, 2020

Related U.S. Application Data

(63) Continuation of application No. 16/129,365, filed on Sep. 12, 2018, now Pat. No. 10,764,149.

(51) Int. Cl.
*H04L 41/14* (2022.01)
*H04L 41/069* (2022.01)
(Continued)

(52) U.S. Cl.
CPC ........ *H04L 41/145* (2013.01); *G06F 16/9024* (2019.01); *H04L 41/069* (2013.01); *H04L 41/16* (2013.01); *H04L 41/28* (2013.01)

(58) Field of Classification Search
CPC ....... H04L 41/145; H04L 45/42; G06F 21/00; G06F 16/951
(Continued)

(56) References Cited

U.S. PATENT DOCUMENTS 6,625,603 B1 * 9/2003 Garg ................. G06F 9/468
707/758
7,644,365 B2 * 1/2010 Bhattacharya ...... H04L 63/1416
715/736
(Continued)

FOREIGN PATENT DOCUMENTS

CA         3028273 A1 *  8/2017 ............. G06F 15/16
WO    2017/127639 A1     7/2017

OTHER PUBLICATIONS

Chen et al., "Concept-based event identification from social streams using evolving social graph sequences", 2015 (Year: 2015).*
(Continued)

*Primary Examiner* — Nam T Tran
(74) *Attorney, Agent, or Firm* — Morrison & Foerster LLP

(57) ABSTRACT

Described are methods, systems, and computer-program product embodiments for deriving a model of computation of a cyber-physical system (CPS). In some embodiments, a method includes receiving, from the CPS network, network-events data corresponding to a process performed by the CPS and including network events and associated group IDs. A plurality of events logs for a plurality of selections of group IDs are generated with each events log including a sequence of network events selected from the network events based on the selection of group IDs for that events log. A plurality of directed graphs for the plurality of events logs are generated with each directed graph generated based on the sequence of network events in the events log. A plurality of group IDs can be determined based on a directed graph selected from the plurality of directed graphs based on a complexity score calculated for each directed graph.

29 Claims, 7 Drawing Sheets

(51) Int. Cl.
*H04L 41/28* (2022.01)
*H04L 41/16* (2022.01)
*G06F 16/901* (2019.01)

(58) Field of Classification Search
USPC .......................................................... 709/224
See application file for complete search history.

(56) References Cited

U.S. PATENT DOCUMENTS

| | | | |
|---|---|---|---|
| 7,975,059 B2 | 7/2011 | Wang et al. | |
| 7,979,844 B2 | 7/2011 | Srinivasan | |
| 8,209,567 B2* | 6/2012 | Cohen | G06F 16/285 714/45 |
| 8,533,193 B2* | 9/2013 | Hubbard | G06F 16/332 707/737 |
| 8,725,901 B2 | 5/2014 | Smith et al. | |
| 8,935,677 B2 | 1/2015 | Cui et al. | |
| 9,047,025 B2 | 6/2015 | Zeng et al. | |
| 9,141,807 B2 | 9/2015 | Chou et al. | |
| 2002/0156882 A1* | 10/2002 | Natarajan | H04L 29/12264 709/224 |
| 2005/0009053 A1* | 1/2005 | Boecker | C12Q 1/6872 435/6.13 |
| 2005/0172162 A1* | 8/2005 | Takahashi | G06F 11/079 714/4.4 |
| 2005/0182708 A1* | 8/2005 | Moudgal | G06Q 99/00 705/38 |
| 2006/0161816 A1* | 7/2006 | Gula | H04L 41/065 714/39 |
| 2010/0161671 A1* | 6/2010 | Charnine | G06F 16/355 707/797 |
| 2010/0312877 A1* | 12/2010 | Xie | H04L 63/1408 709/224 |
| 2012/0166556 A1* | 6/2012 | Kim | H04L 67/1065 709/206 |
| 2013/0124164 A1* | 5/2013 | Jha | G06F 30/00 703/2 |
| 2013/0346580 A1 | 12/2013 | Kim et al. | |
| 2014/0019104 A1* | 1/2014 | Martinez Canedo | G06F 30/20 703/6 |
| 2014/0330956 A1* | 11/2014 | Telfer | H04L 43/04 709/224 |
| 2015/0096026 A1* | 4/2015 | Kolacinski | G06N 7/005 726/23 |
| 2015/0106324 A1* | 4/2015 | Puri | G06F 11/079 706/52 |
| 2015/0261958 A1 | 9/2015 | Hale et al. | |
| 2016/0248791 A1* | 8/2016 | Tidwell | H04L 63/14 |
| 2017/0013656 A1 | 1/2017 | Van Phan et al. | |
| 2017/0111223 A1 | 4/2017 | Matni et al. | |
| 2017/0124492 A1 | 5/2017 | Crabtree et al. | |
| 2017/0127471 A1 | 5/2017 | Yu et al. | |
| 2017/0142143 A1* | 5/2017 | Seward | G06F 16/212 |
| 2017/0279840 A1* | 9/2017 | Zhang | H04L 63/1425 |
| 2018/0054351 A1* | 2/2018 | Bhandari | H04L 41/0604 |
| 2018/0101429 A1* | 4/2018 | Melanchenko | G06F 11/0772 |
| 2018/0150043 A1 | 5/2018 | Tucker et al. | |
| 2018/0159890 A1* | 6/2018 | Warnick | G06F 7/08 |
| 2018/0295036 A1* | 10/2018 | Krishnamurthy | G06F 11/3006 |
| 2018/0324154 A1 | 11/2018 | Crabtree et al. | |
| 2019/0068697 A1 | 2/2019 | Darby, III | |
| 2019/0228110 A1* | 7/2019 | Yan | G06N 3/0472 |
| 2020/0067787 A1 | 2/2020 | Patra et al. | |
| 2021/0092150 A1* | 3/2021 | Crabtree | H04L 63/1408 |

OTHER PUBLICATIONS

Jin et al., "Understanding Security Group Usage in a Public IaaS Cloud", 2016 (Year: 2016).*
Katzela, et al., "Schemes for Fault Identification in Communication Networks", 1995 (Year: 1995).*
Liu et al., "E-Cube: Multi-Dimensional Event Sequence Analysis Using Hierarchical Pattern Query Sharing", 2011 (Year: 2011).*
Martinez-Bazan et al., "Efficient Graph Management Based on Bitmap Indices", 2012 (Year: 2012).*
Nikolopoulos et al., "A graph-based model for malware detection and classification using system-call groups", 2016 (Year: 2016).*
Nguyen et al., "Mining Business process Stages from Event Logs", 2017 (Year: 2017).*
Ribeiro et al., "Sampling Directed Graphs with Random Walks", 2012 (Year: 2012).*
Senaweera et al., "A Weighted Network Analysis of User Migrations in a Social Network", 2018 (Year: 2018).*
Sorensen et al., "Directed Labeled Graph", 2006 (Year: 2006).*
Vrotsou et al., "ActiviTree: Interactive Visual Exploration of Sequences in Event-Based Data Using Graph Similarity", 2009 (Year: 2009).*
Wikipedia, "Cyber-physical system", 2021 (Year: 2021).*
Wikipedia, "Directed graph", 2021 (Year: 2021).*
Wikipedia, "sequence graph", 2021 (Year: 2021).*
Wu et al., "Structural Event Detection from Log Messages", 2017 (Year: 2017).*
Yongsiriwit et al., "Log-based Process Fragment Querying to Support Process Design", 2015 (Year: 2015).*
(1999) "Cyber-Physical Systems," located at http://ptolemy.berkeley.edu/projects/cps/ visited on Apr. 25, 2020. (2 pages).
Currie (May 2017) "Hacking the CAN bus: Basic Manipulation of a Modern Automobile Through CAN Bus Reverse Engineering," The SANS Institute. (57 pages).
Davis (2015). "Graphic-Based Modeling for Cyber-Physical Systems," ProQuest. 13 pages.
Masudal Alam et al. (Jan. 2017) "C2PS: A Digital Twin Architecture Reference Model for the Cloud-Based Cyber-Physical Systems," IEEEAccess 5:2050-2062.
Smith (2016) "Reverse Engineering the Can Bus," Chapter 5 in The Car Hacker's Handbook: A Guide for the Penetration Tester, 24 pages.
Whalen et al. (2010) "Hidden Markov Models for Automated Protocol Learning," SecureComm 2010, LNICST 50: 415-428.
Yin et al. (Sep. 2017). "Network Location-Aware Service Recommendation with Random Walk in Cyber-Physical Systems," Sensors 2017:1-20.

* cited by examiner

CYBER-PHYSICAL SYSTEM EVALUATION

CROSS REFERENCE TO RELATED APPLICATION

This application is a continuation of U.S. application Ser. No. 16/129,365, filed Sep. 12, 2018, the entire contents of which are incorporated herein by reference.

FIELD OF THE DISCLOSURE

This disclosure relates generally to system and methods for evaluating a cyber-physical system (CPS) and more specifically, for deriving a model of computation of the CPS.

BACKGROUND OF THE DISCLOSURE

A cyber-physical system (CPS) is a system having one or more interacting networks of nodes (e.g., physical components and software components). A modern CPS is often built with network connectivity, e.g., connection to the Internet. The CPS can range from Industrial Control Systems (ICS) to Internet of Things (IoT) systems and encompass a wide variety of protocols, buses, and networks. Examples of CPS may include smart grid, autonomous vehicles, medical monitoring devices, automatic pilot avionics, scientific instruments, etc.

To detect potential vulnerabilities of the CPS and to defend against potential cyber threats, system operators rely on CPS tools for assessing a network of the CPS. These CPS tools, however, often rely on a priori knowledge of the application processes implemented by the CPS, which is not always available to the system operators. Even when a priori knowledge of application processes is available, such knowledge may not be reliable and may be inaccurate. Additionally, many CPS tools rely on the information provided by one or more nodes in the CPS to evaluate the CPS. Such reliance on high-level observation of the CPS network from a CPS node may render these CPS tools more vulnerable to a malfunctioning or hacked CPS node that may produce false or erroneous data. Therefore, there is a need to evaluate the CPS based on the low-level network traffic without relying on specific CPS nodes and without knowledge of how the CPS operates.

Additionally, under typical operation, the CPS can generate many hundreds or thousands of network messages on the CPS network when performing a process of interest to a system operator. Deriving the underlying model of computation for the CPS may be difficult because these network messages may correspond to overlapping processes concurrently being executed by a plurality of nodes in the CPS.

Further, a broadcast message-based communication protocol, such as the Controller Area Network (CAN) protocol, does not specify explicit "from" and "to" device addresses or IDs in network messages. Instead, each network message may include a group ID (e.g., an arbitration ID in the CAN protocol) that specifies a data type of the network message. The use of the group ID allows network messages belonging to the same process or role to be assigned to the same group and allows network nodes to operate on processes instead of device addresses. While group IDs are useful for enabling multi-master broadcast systems, in which multiple nodes may operate on the same network message having an assigned group ID, the lack of device addresses or IDs makes deriving a model of computation of the CPS difficult. In some embodiments, the group ID may also be associated with a priority level. The use of group IDs being associated with respective priority levels further enables a multi-master, broadcast system where one node wins transmission priority if multiple nodes attempt to transmit their messages concurrently.

The overlapping processes and lack of device addresses (in certain CPS networks) contribute to the reasons that many CPS tools rely on information provided by one or more CPS nodes in the network. By observing network messages processed or transmitted by specific CPS nodes, these CPS tools may be capable of deriving the underlying model of computation for that CPS with respect to a process of interest being executed by the CPS. As explained above, however, there is a need for CPS tools to evaluate CPS based on the low-level network traffic without relying on information provided by specific CPS nodes.

SUMMARY OF THE DISCLOSURE

To address the problems noted above, the disclosed embodiments describe system, method, apparatus, and computer program product embodiments for deriving a model of computation of a cyber-physical system (CPS) based on evaluating network traffic of the CPS.

In some embodiments, network traffic of the CPS performing a process can be parsed into network events for storage as network-events data. A network event may be a network message transmitted by a CPS node onto a network of the CPS at a specific time. In some embodiments, the CPS can generate a plurality of events logs based on the network-events data to correspond to a plurality of selections of network events from the network-events data. In some embodiments, each selection of network events corresponds to two or more group IDs selected from unique group IDs identified in the network-events data. In some embodiments, each events log can be associated with a directed graph having vertices associated with network events in the events log and having directed edges associated with a sequence of network events in the events log. In some embodiments, a complexity score can be calculated for the directed graph associated with the events log to determine whether the two or more selected group IDs correspond to the model of computation of the CPS for performing the process. In some embodiments, the complexity score can be calculated based on a plurality of graph metrics of the directed graph. Such graph metrics may include a density, a reciprocity, a radius, a diameter, etc.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

In some embodiments, a method for deriving a model of computation of a cyber-physical system (CPS) comprises: receiving network-events data of a CPS network, wherein the network-events data corresponds to a process performed by the CPS and comprises a plurality of network events and associated group IDs; generating a plurality of events logs corresponding to a plurality of selections of two or more group IDs, wherein each events log comprises a sequence of network events selected from the plurality of network events based on the selection of two or more group IDs for the events log; generating a plurality of directed graphs corresponding to the plurality of events logs, wherein each directed graph is generated based on the sequence of network events in the events log; selecting a directed graph from the plurality of directed graphs based on a complexity score calculated for each directed graph; and determining that a plurality of group IDs corresponding to the selected directed graph is associated with the model of computation of the CPS to perform the process.

In some embodiments, the method comprises: providing the directed graph to a user, wherein the directed graph corresponds to the model of computation implemented by the CPS to perform the process.

In some embodiments, generating a directed graph based on the sequence of network events in the events log comprises: generating a plurality of vertices in the directed graph, wherein the plurality of vertices correspond to the network events in the events log; and generating a plurality of directed edges in the directed graph based on the sequence of network events, wherein a directed edge between two vertices corresponds to two adjacent network events in the sequence of network events.

In some embodiments, the method comprises: determining a frequency count for each directed edge of the plurality of directed edges based on the sequence of network events; selecting a subset of directed edges from the plurality of directed edges based on the frequency count for a directed edge falling below a frequency threshold; calculating an edge betweenness centrality for each directed edge from the subset of directed edges; and deleting a directed edge of the subset of directed edges from the directed graph upon determining that the edge betweenness centrality for the directed edge falls below a betweenness threshold.

In some embodiments, generating the directed graph based on the sequence of network events in the events log comprises: merging two or more vertices in the directed graph based on a parallel or a serial equivalence of the two or more vertices to generate a reduced directed graph for the events log.

In some embodiments, the CPS network is configured to implement a control network protocol in which subsets of network traffic are associated with respective, different types of data, each of which can be identified by a group identifier (ID).

In some embodiments, generating the plurality of events logs corresponding to the plurality of unique selections of two or more group IDs comprises: identifying a plurality of unique group IDs from the network-events data; and selecting the two or more group IDs from the plurality of unique group IDs.

In some embodiments, receiving the network-traffic data comprises: detecting network messages transmitted on a communication bus of the CPS; and storing the network messages as the network-traffic data.

In some embodiments, the complexity score for a directed graph is calculated based on a plurality of graph metrics of the directed graph.

In some embodiments, the plurality of graph metrics comprises a density, a reciprocity, a radius, or a diameter. In some embodiments, the plurality of graph metrics comprises a density, a reciprocity, a radius, and a diameter.

In some embodiments, a system for deriving a model of computation of a cyber-physical system (CPS) comprises: one or more processors and memory storing one or more programs that when executed by the one or more processors cause the one or more processors to: receive network-events data of a CPS network, wherein the network-events data corresponds to a process performed by the CPS and comprises a plurality of network events and associated group IDs; generate a plurality of events logs corresponding to a plurality of unique selections of two or more group IDs, wherein each events log comprises a sequence of network events selected from the plurality of network events based on the unique selection of two or more group IDs for the events log; generate a plurality of directed graphs corresponding to the plurality of events logs, wherein each directed graph is generated based on the sequence of network events in the events log; select a directed graph from the plurality of directed graphs based on a complexity score calculated for each directed graph; and determine that a plurality of group IDs corresponding to the selected directed graph is associated with the model of computation of the CPS to perform the process.

In some embodiments, the one or more processors are caused to: provide the directed graph to a user, wherein the directed graph corresponds to the model of computation implemented by the CPS to perform the process.

In some embodiments, to generate a directed graph based on the sequence of network events in the events log, the one or more processors are caused to: generate a plurality of vertices in the directed graph, wherein the plurality of vertices correspond to the network events in the events log; and generate a plurality of directed edges in the directed graph based on the sequence of network events, wherein a directed edge between two vertices represents two adjacent network events in the sequence of network events.

In some embodiments, the one or more processors are caused to: determine a frequency count for each directed edge of the plurality of directed edges based on the sequence of network events; select a subset of directed edges from the plurality of directed edges based on the frequency count for a directed edge falling below a frequency threshold; calculate an edge betweenness centrality for each directed edge from the subset of directed edges; and delete a directed edge of the subset of directed edges from the directed graph upon determining that the edge betweenness centrality for the directed edge falls below a betweenness threshold.

In some embodiments, to generate the directed graph based on the sequence of network events in the events log, the one or more processors are caused to: merge two or more vertices in the directed graph based on a parallel or a serial equivalence of the two or more vertices to generate a reduced directed graph for the events log.

In some embodiments, the CPS network is configured to implement a control network protocol in which subsets of network traffic are associated with respective, different types of data, each of which can be identified by a group identifier (ID).

In some embodiments, to generate the plurality of events logs corresponding to the plurality of unique selections of two or more group IDs, the one or more processors are caused to: identify a plurality of unique group IDs from the network-events data; and select the two or more group IDs from the plurality of unique group IDs.

In some embodiments, to receive the network-traffic data, the one or more processors are caused to: detect network messages transmitted on a communication bus of the CPS; and store the network messages as the network-traffic data.

In some embodiments, the complexity score for a directed graph is calculated based on a plurality of graph metrics of the directed graph.

In some embodiments, the plurality of graph metrics comprises a density, a reciprocity, a radius, or a diameter. In some embodiments, the plurality of graph metrics comprises a density, a reciprocity, a radius, and a diameter.

In some embodiments, a non-transitory computer-readable storage medium includes instructions for deriving a model of computation of a cyber-physical system (CPS), and the instructions, when executed by one or more processors, cause the one or more processors to perform instructions including: receiving network-events data of a CPS network, wherein the network-events data corresponds to a process performed by the CPS and comprises a plurality of network events and associated group IDs; generating a plurality of events logs corresponding to a plurality of unique selections of two or more group IDs, wherein each events log comprises a sequence of network events selected from the plurality of network events based on the unique selection of two or more group IDs for the events log; generating a plurality of directed graphs corresponding to the plurality of events logs, wherein each directed graph is generated based on the sequence of network events in the events log; selecting a directed graph from the plurality of directed graphs based on a complexity score calculated for each directed graph; and determining that a plurality of group IDs corresponding to the selected directed graph is associated with the model of computation of the CPS to perform the process.

BRIEF DESCRIPTIONS OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings.

DETAILED DESCRIPTION OF THE DISCLOSURE

Figure 1:
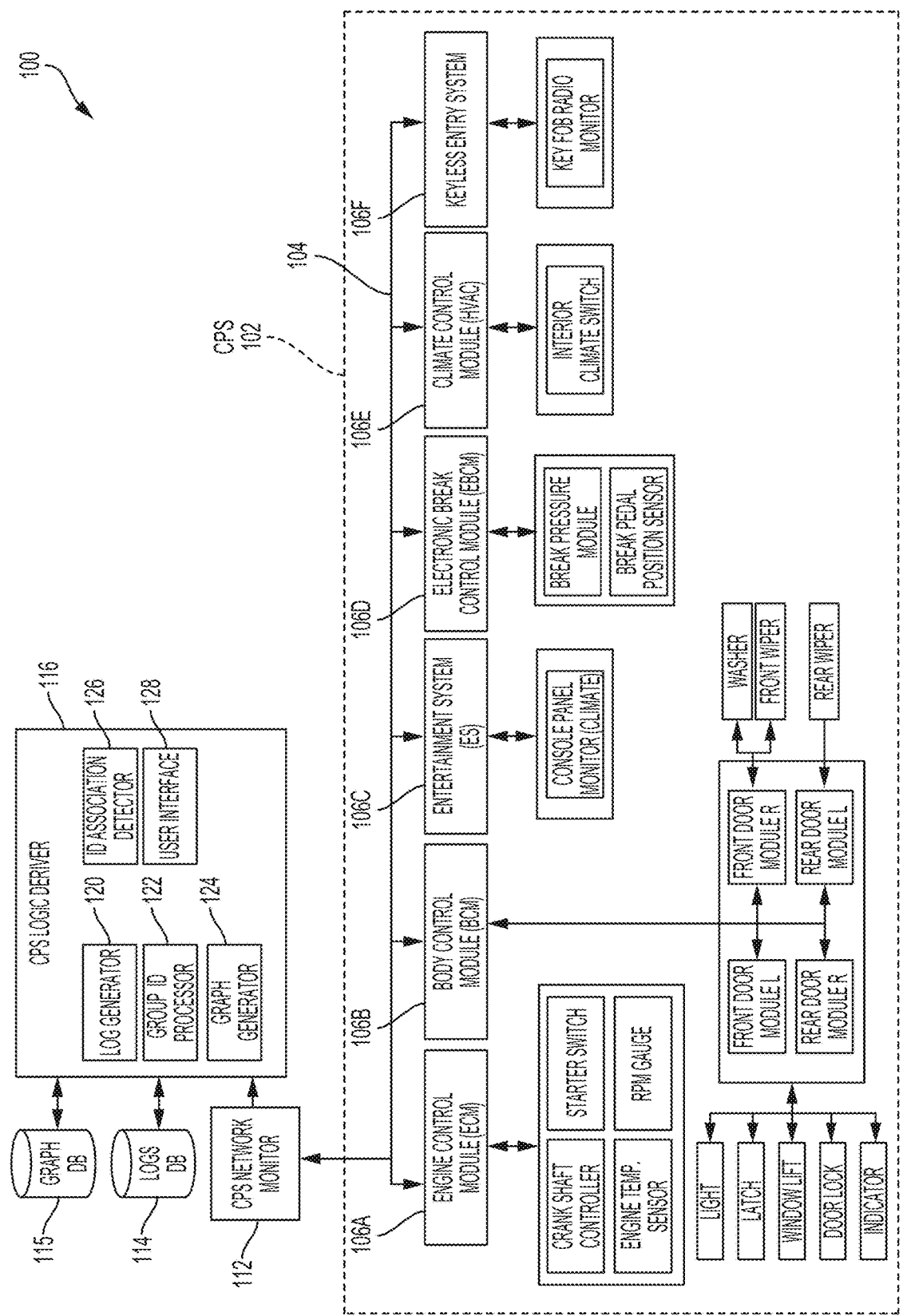
FIG. 1 illustrates a system for deriving a model of computation of a cyber-physical system (CPS), according to some embodiments.

Described herein are systems, methods, apparatuses, and computer program product embodiments for deriving a model of computation of a cyber-physical system (CPS) based on evaluating network traffic of the CPS. In some embodiments, by directly evaluating the low-level network traffic of the CPS instead of higher-level information provided by one or more CPS nodes, a system for deriving the model of computation of the CPS can retain higher fidelity and be less vulnerable to malfunctioning or hacked CPS nodes. Additionally, such a system for evaluating the CPS may be easier to implement and less intrusive than systems that require direct connections to one or more CPS nodes because access to any portion of the CPS network may be sufficient. In some embodiments, the model of computation of the CPS specifies an operation of the CPS based on one or more inputs provided to the CPS. For example, the model of computation being derived may be a finite-state machine (i.e., a sequential machine), which includes a plurality of states of the CPS and includes a plurality of transitions between states. Such a finite-state machine may be represented as a directed graph.

In some embodiments, as will be further described below, a system for deriving a model of computation of the CPS can be configured to parse network events and associated group IDs from network traffic detected in a network of the CPS performing a process of interest. Typical network traffic of the CPS performing the process, however, can include hundreds if not thousands of network events, many of which are not related to a process of interest. Additionally, the CPS network may be asynchronous or implement non-deterministic message ordering. These characteristics of the CPS network can make differentiating group IDs associated with the process difficult and contributes to the reason that typical CPS tools rely on higher-level information provided by CPS nodes.

In some embodiments, to identify associated group IDs, the system for deriving the model of computation of the CPS for a process can be configured to parse the network-events data of the CPS network to generate a plurality of events logs with each events log corresponding to a unique selection of network events from the network-events data. In some embodiments, the unique selection of network events correspond to a selection of group IDs from unique group IDs identified in the network-events data. Then, for each events log, the system can be configured to generate a directed graph representative of a sequence of network events stored in that events log. In some embodiments, the system can quantify a complexity of the directed graph representative of the events log to determine whether the selection of group IDs used to generate the events log are related to each other and corresponds to the process of interest. In some embodiments, related group IDs are likely to result in an ordered sequence of network events, which results in less complex directed graph. In contrast, unrelated group IDs are likely to result in randomly ordered network events, which results in a more complex directed graph.

FIG. 1 illustrates a system 100 for deriving a model of computation of a cyber-physical system (CPS) based on network traffic of the CPS, according to some embodiments. System 100 includes a CPS 102, CPS network monitor 112, logs database (DB) 114, graph database (DB) 115, and CPS logic deriver 116. In some embodiments, CPS network monitor 112 can be configured to monitor network traffic of CPS 102 for processes performed by CPS 102. CPS logic deriver 116 may derive the model of computation of CPS 102 performing a process based on the network traffic monitored during the performing of the process. For example, CPS 102 may be an example of an automobile system inside a car. In this example, processes may include, without limitation, wake-up, ignition, engine idle, door locking, turn signaling, acceleration, or deceleration, etc.

In some embodiments, CPS 102 includes a plurality of nodes 106A-F connected to a CPS network 104. In some embodiments, CPS network 104 includes a network communication bus. During general CPS operation, one or more nodes 106A-F generate network messages that are transmitted on the network communication bus. These network messages may correspond to network traffic of CPS network 104. In some embodiments, a network event of the network traffic corresponds to a network message being transmitted on CPS network 104 at a specific time.

In some embodiments, CPS 102 can be configured to implement a control network protocol in which subsets of network traffic are associated with respective, different types of data, each of which can be identified by a group identifier (ID). In some embodiments, each network message of the control network protocol can include a group ID to specify the subset of network traffic and associated process in which that network message belongs. Such a control network protocol differs from network protocols that operate on source or destination identifiers (e.g., addresses) in network messages indicating a node sending the network messages or a node that is to receive the network message, according to some embodiments. In other words, a plurality of network messages having the same group ID indicates that the plurality of network messages belongs to a common group or role regardless of which nodes sent the plurality of network messages. For example, such a control network protocol may include the Controller Area Network (CAN) protocol. For illustration purposes, the following descriptions may be provided in reference to the CAN protocol. However, as described above, the embodiments disclosed herein are applicable to any network that implements a control network protocol in which subsets of network traffic are associated with respective, different types of data, each of which can be identified by a group identifier (ID).

As shown in system 100, CPS network 104 may include a CAN bus and nodes 106A-F may be Electronic Control Units (ECUs). For example, CPS 102 may be an automotive system and as shown in system 100, nodes 106A-F may correspond to the following embedded systems: an Engine Control Module, a Body Control Module, an Entertainment System, an Electronic Break Control Module, a Climate Control Module, and a Keyless Entry System.

In some embodiments, CPS network monitor 112 can be a system configured to monitor network traffic on CPS network 104 while CPS 102 performs a process. For example, CPS network monitor 112 may include a passive network TAP (Terminal Access Point) having one or more sensors to receive network traffic occurring on CPS network 104. Network traffic may include network events such as network messages having a data format specified by a network communications protocol implemented by CPS 102. In some embodiments, CPS network monitor 112 can be configured to parse network events from the monitored network traffic to generate network-events data. In some embodiments, the network-events data may be stored in an initial events log storing network events. In some embodiments, the initial events log can be transmitted to CPS logic deriver 116. In other embodiments, the initial events log can be stored in logs DB 114, which may be accessible by CPS logic deriver 116.

In some embodiments, CPS network monitor 112 can be configured to implement a plurality of protocol plugins to enable CPS network monitor 112 to parse network events from different CPS networks operating different communication protocols. For example, the plurality of protocol plugins may include a Modbus plugin, a Process Field Bus (PROFIBUS) plugin, a Distributed Network Protocol (DNP3) plugin, an RS-485 plugin, a CAN plugin, etc.

In some embodiments, CPS logic deriver 116 can be configured to analyze network traffic on CPS network 104 to derive the model of computation of CPS 102. For example, CPS logic deriver 116 may generate a directed graph of IDs associated with the network traffic to approximate internal operating states of CPS 102 to perform a specific process. In some embodiments, to derive the model of computation, CPS logic deriver 116 can implement the following components: log generator 120, group ID processor 122, graph generator 124, ID association detector 126, and user interface 128. In some embodiments, CPS logic deriver 116 can include one or more processors to implement each of these components. Each component may include a selection of stored, programming instructions that when executed by the one or more processors causes the one or more processors to perform the instructions of that component.

In some embodiments, log generator 120 can be configured to generate an initial events log based on the network-events data received from CPS network monitor 112. For example, log generator 120 may generate the initial events log by translating the network-events data into an event-formatted data structure. In some embodiments, the initial events log can be generated by CPS network monitor 112 and received at CPS logic deriver 116, as described above with respect to CPS network monitor 112. In some embodiments where CPS network monitor 112 stores a generated initial events log in logs DB 114, log generator 120 can query logs DB 114 to retrieve the initial events log.

In some embodiments, log generator 120 can generate a plurality of initial events logs corresponding to a plurality of processes performed by CPS 102. As will be further described below, CPS logic deriver 116 may be enabled to derive the underlying model of computation implemented by CPS 102 to perform a specific process on analysis of the events log corresponding to that process.

In some embodiments, log generator 120 can store a generated initial events log in logs database (DB) 114. In some embodiments, the event-formatted data structure of the initial events log can include a plurality of event entries. Each of the event entries can include one or more of the following data fields: a timestamp (e.g., an absolute timestamp), an ID (e.g., a group ID, a device address, a datatype, etc.), a data value, a sequence number, or a delta time since the last data value changed. In some embodiments, each event entry includes at least the timestamp, the ID, and the data value.

In some embodiments, log generator 120 can receive the network-events data from CPS network monitor 112 via a network communicatively coupling CPS logic deriver 116 and CPS network monitor 112. For example, the network may include a local area network (LAN), a wide area network (WAN), the Internet, a Wi-Fi network, a WiMAX network, a cellular network (e.g., 3G, 4G, 4G Long Term Evolution (LTE)), Ethernet, or a combination thereof. Further, the network may implement one or more wired and/or wireless standards or protocols.

In some embodiments, group ID processor 122 can be configured to select a plurality of subsets of group IDs from a plurality of unique group IDs identified from the network-events data. As described above, the network-events data may include a plurality of network events that each includes a group ID specifying a data type or priority level of the network message associated with the network event. In some embodiments, group ID processor 122 can parse the network-events data or an initial events log storing the network-events data to identify the plurality of unique group IDs. In some embodiments, group ID processor 122 can select unique subsets of the plurality of group IDs. For example, each subset may include one, two, three, four, or five, etc. different group IDs. In some embodiments, each selected subset of group IDs includes at least two group IDs.

In some embodiments, group ID processor 122 can invoke log generator 120 to generate a plurality of events logs corresponding to a plurality of selections of group IDs based on the network-events data. In some embodiments, each selection may include two or more group IDs. Log generator 120 may store a generated events log in logs DB 114. In some embodiments, each events log includes a sequence of network events selected from the plurality of network events in the network-events data where each selected network event includes one of the group IDs associated with the events log. In some embodiments, the functionality of group ID processor 122 may be implemented by other components of CPS logic deriver 116 such as log generator 120.

In some embodiments, graph generator 124 can be configured to generate a plurality of directed graphs corresponding to the plurality of events logs generated by log generator 120. As described above with respect to group ID processor 122, each event log may be generated based on a selection of a subset of group IDs from a plurality of unique group IDs identified from the network-events data. In some embodiments, graph generator 124 can generate a directed graph corresponding to an events log based on the sequence of network events in the events log. For example, graph generator 124 may generate vertices of the directed graph based on the plurality of network events in the events log, as will be further described below with respect to FIG. 3. For example, a vertex may correspond to a unique combination of group ID and data value of a network event. Additionally, graph generator 124 may generate directed edges of the directed graph based on the sequence of network events in the events log such that a directed edge between two vertices corresponds to two adjacent network events in the sequence of network events.

In some embodiments, graph generator 124 can be configured to store the plurality of generated directed graphs as a plurality of corresponding graph objects in graph DB 115. In some embodiments, a graph object for storing a representation of a directed graph can be an adjacency list or an adjacency matrix, among other types of data structures known in the art for storing representations of graphs. In the example of the adjacency list, the vertices of the directed graphs may be stored as objects with pointers to one or more objects where the pointers represent directed edges. In the example of the adjacency matrix, the size of the matrix may correspond to the number of vertices and the entries in the matrix may correspond to the directed edges of the directed graph.

As described above with respect to typical CPS operation, there may be hundreds if not thousands of network events in the network traffic of CPS 102 performing a process. Therefore, though a directed graph corresponding to an events log may be associated with only a subset of group IDs, the directed graph may still include hundreds of vertices and hundreds or thousands of directed edges. Additionally, many CPS networks (e.g., CPS network 104) do not impose deterministic message ordering, which means the specific order of two or more network events in the sequence of network events in the events log may have occurred due to random chance. As a result, the directed graph may include many anomalous directed edges that are unrelated to the model of computation of CPS 102 and should be deleted from the directed graph.

In some embodiments, to identify and delete these anomalous directed edges, graph generator 124 can be configured to track a frequency count for each directed edge of the plurality of directed edges based on the sequence of network events in the events log. For example, a first and a second vertex in the directed graph may correspond to a first and a second type of network event in the events log. A type of network event may be associated with a unique combination of group ID and data value. In this example, during the generation of the directed graph, graph generator 124 may increment a frequency counter for a directed edge between the first and the second vertex each time a network event of the second network event type follows and is adjacent to a network event of the first network event type.

In some embodiments, to identify these anomalous directed edges, graph generator 124 can be configured to select a subset of directed edges from the plurality of directed edges based on the frequency count for a directed edge falling below a frequency threshold. A low frequency count for a directed edge may indicate that such a transition observed in the events log may be due to random chance and not associated with the model of computation of CPS 102.

Some directed edges of the selected subset of directed edges, however, may correspond to legitimate state transition logic in the model of computation. In some embodiments, to differentiate directed edges that are anomalous from those that are legitimate with low frequency counts, graph generator 124 can be configured to calculate an edge betweenness centrality for each directed edge from the subset of directed edges. The edge betweenness centrality corresponds to how often an edge resides on the shortest path between any two vertices in the directed graph. According to some embodiments, legitimate and anomalous directed edges can be differentiated from each other because legitimate directed edges are likely to have a higher edge betweenness centrality whereas anomalous directed edges are likely to be more evenly distributed in the directed graph and result in a lower edge betweenness centrality.

In some embodiments, graph generator 124 can be configured to determine whether a directed edge is anomalous based on a frequency count and an edge betweenness centrality of the directed edge. In some embodiments, graph generator 124 can delete a directed edge of the subset of directed edges from the directed graph upon determining that the edge betweenness centrality for the directed edge falls below a betweenness threshold.

In some embodiments, ID association detector 126 can be configured to determine which group IDs and related network events correspond to the model of computation of CPS 102 to perform the process of interest based on analyzing the plurality of directed graphs corresponding to the plurality of events logs. As described above, each events log may be associated with a subset of group IDs selected from a plurality of unique group IDs determined from the network-events data. In some embodiments, ID association detector 126 can analyze each directed graph by calculating a complexity score for each directed graph to quantify a complexity of the directed graph. A graph complexity of a composite directed graph of related group IDs should be relatively similar to the graph complexity of the underlying model of computation of one or more CPS nodes 106A-F associated with the process. This is because related group IDs are likely to result in highly-ordered network events, whose order corresponds to the underlying model of computation of CPS 102. In contrast, a directed graph of unrelated group IDs may result in an "explosion" of graph complexity over time because more and more anomalous directed edges may be introduced in the directed graph as a result of random or unrelated ordering of network events associated with unrelated group IDs.

In some embodiments, ID association detector 126 can select a directed graph from the plurality of directed graphs based on the complexity score calculated for each directed graph. For example, ID association detector 126 may select the directed graph as having the highest complexity score. In another example, ID association detector 126 may select one or more directed graphs from the plurality of directed graphs based on one or more corresponding complexity scores exceeding a complexity threshold. In some embodiments, ID association detector 126 can determine that a plurality of group IDs corresponding to the selected one or more directed graphs as being associated with the model of computation of CPS 102 for performing the process.

In some embodiments, ID association detector 126 can calculate the complexity score for a directed graph based on a plurality of graph metrics calculated for the directed graph. For example, such graph metrics may include one or more of a density, a reciprocity, a radius, a diameter of the directed graph. In some embodiments, the plurality of graph metrics includes at least the density, the reciprocity, and the radius of the directed graph. In some embodiments, the plurality of graph metrics includes the density, the reciprocity, the radius, and the diameter of the directed graph. In some embodiments, ID association detector 126 can be configured to calculate the complexity score by weighing each metric of the plurality of graph metrics calculated for the directed graph. In some embodiments, the weight for each graph metric can be algorithmically calculated using a machine learning algorithm such as a decision tree, a neural network, or a Support Vector Machine (SVM), or the like. In some embodiments, ID association detector 126 can be configured to calculate the complexity score by inputting the plurality of calculated graph metrics as features into the machine learning algorithm.

In some embodiments, a reciprocity is a measure of the likelihood of vertices in a directed graph to be mutually linked. In some embodiments, reciprocity can be calculated based on a total number of links in the directed graph, a number of links pointing in both directions, or a number of vertices in the directed graph. In some embodiments, a directed graph including two or more related group IDs are more likely to include strongly ordered sequence of network. Therefore, a lower reciprocity may be an indicator that the two or more group IDs in the graph are related to each other. The reciprocity may be calculated in various ways. For example, an algorithm for calculating the reciprocity (r) may be determined based on the ratio of the number of directed edges being reciprocated. Another example may be calculating the ratio of links pointing in both directions $L^{\leftrightarrow}$ to the total number of links L in the directed graph (i.e., $r=L^{\leftrightarrow}/L$). Another example for calculating the reciprocity may be the Garlaschelli and Loffredo definition, which is based on a total number of links in the directed graph, a number of links pointing in both directions, or a number of vertices in the directed graph.

In some embodiments, a density is a measure of the number of edges in the graph relative to the maximum number of possible edges. In some embodiments, the density (D) can be calculated based on the number of edges (|E|) and the number of vertices (|V|) in the directed graph according to the following formula: $D=|E|/(|V|(|V|-1))$. As described above, a directed graph including two or more related group IDs are likely to have a lower density metric because related group IDs are likely to correspond to strongly ordered data. If the two or more group IDs are unrelated and not perfectly synchronized in time, a specific sequence of vertices is unlikely to form and more edges are likely to form to produce a more dense directed graph.

In some embodiments, a radius and a diameter of a directed graph corresponds to a minimum and maximum eccentricity, respectively, of any vertices in the directed graph where the eccentricity of a vertex is defined as the length of the longest shortest path between that vertex and any other vertex in the directed graph. In some embodiments, the radius and the diameter can be used to determine whether the directed graph includes long, repeated sequences. In some embodiments, a higher radius, a higher diameter, or a combination thereof may be an indicator that the two or more group IDs shown in the directed graph are related. This is because it is statistically unlikely for a long repeated cycle of vertices to persist when combined with an unrelated cycle. Therefore existence of chordless cycles (i.e., "graph holes") may be indicative of association.

In some embodiments, ID association detector 126 can calculate the complexity score for a directed graph based on a comparative metric associated with the directed graph corresponding to a plurality of group IDs. In particular, ID association detector 126 may compare the plurality of graph metrics for the directed graph against a plurality of graph metrics calculated for each directed graph corresponding to each group ID from the plurality of group IDs. In some embodiments, in addition to computing the plurality of graph metrics for the directed graph, as discussed above, ID association detector 126 can be configured to calculate the comparative metric for the directed graph to determine the complexity score for the directed graph.

In some embodiments, ID association detector 126 can be configured to provide the selected directed graph to a security system configured to monitor and assess network security of CPS 102. As discussed above, the directed graph may represent a model of computation of CPS 102 for performing the process. Therefore, the security system may analyze the directed graph to determine whether CPS 102 is operating anomalously or potentially infected by a cyber threat. Upon detecting the cyber threat, the security system may notify the user of the detected threat or initiate actions (e.g., shut down portions of CPS 102, generate alerts, execute anti-virus scanners, etc.) to remedy the detected threat. In some embodiments, CPS logic deriver 116 (which includes ID association detector 126) may be a component of such a security system.

In some embodiments, user interface 128 can be configured to provide the selected directed graph to a user such as a system operator of CPS 102. For example, user interface 128 may display the selected directed graph on a display screen of a user device operated by the user. In some embodiments, user interface 128 can implement a web interface to enable the user to utilize a web browser or application to access evaluation results of CPS logic deriver 116. In some embodiments, the directed graph selected and displayed by user interface 128 may enable the user to determine whether CPS 102 is behaving anomalously or compromised by a cyber threat (e.g., malware). Upon making such a determination, the user may initiate actions (e.g., shut off portions of CPS 102, log a report, reinstall software or firmware, etc.) on CPS 102 to remedy the detected threat.

Figure 2:
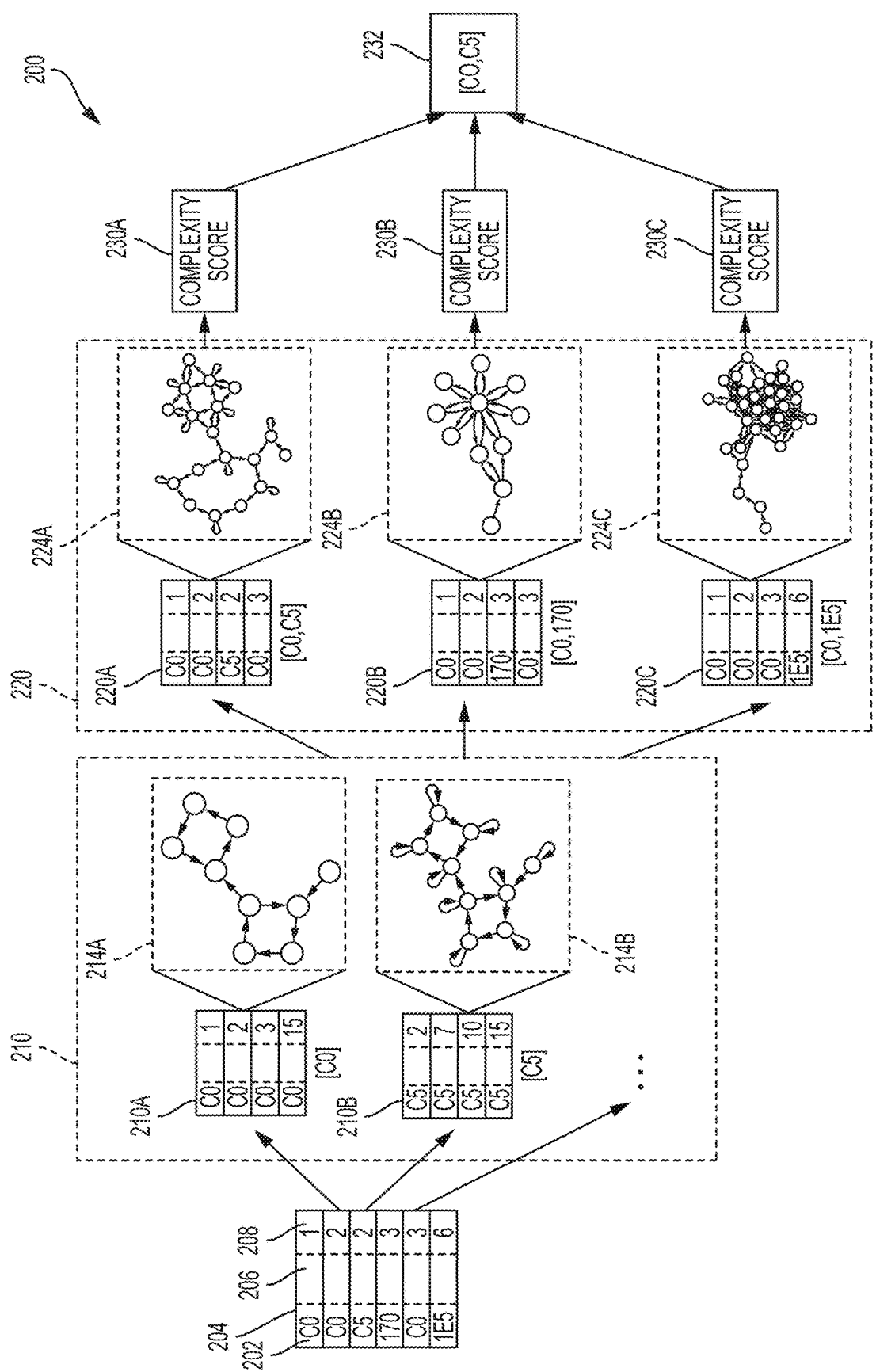
FIG. 2 illustrates a diagram showing how the model of computation of the CPS can be derived, according to some embodiments.

FIG. 2 illustrates a diagram 200 showing how a model of computation of a CPS (e.g., CPS 102) can be derived, according to some embodiments. For ease of reference, diagram 200 will be described with respect to the systems and components of FIG. 1. In particular, CPS network monitor 112 may generate network-events data 202 based on monitored network traffic of CPS 102 performing a process of interest. As shown in diagram 200, network-events data 202 may be stored as an initial events log storing network events each having the following data fields: group ID 204, data 206, and a timestamp 208. For example, group IDs 204 in network-events data 202 may include "C0", "C5", "170", and "1E5".

In some embodiments, group ID processor 122 can cause log generator 120 to generate a plurality of events logs 210 corresponding to a plurality of group IDs 204 identified from network-events data 202. For example, log generator 120 may generate events logs 210A and 210B for identified group IDs "C0" and "C5", respectively. To generate an events log corresponding to a group ID, log generator 120 may select network events from network-events data 202 associated with the group ID. Graph generator 124 may generate directed graphs 214A-B corresponding to events logs 210A-B, respectively, based on the sequence of network events in each of events log 210A-B. As discussed above with respect to FIG. 1, graph generator 124 may store each of generated directed graphs 214A-B in respective graph objects in graph DB 115.

In some embodiments, group ID processor 122 can cause log generator 120 to generate a plurality of events logs 220 corresponding to a plurality of selections of group IDs from group IDs 204 identified from network-events data 202. In some embodiments, each selection of group IDs include two or more group IDs. For example, log generator 120 may generate events logs 220A, 220B, and 220C for the following respective selected subsets of group IDs: [C0, C5], [C0, 170], and [C0, 1E5]. In some embodiments, log generator 120 can generate events logs 220A-C by combining two or more events logs 210A-B. For example, to generate events log 220A associated with group IDs "C0" and "C5", log generator 120 may combine events log 210A and 210B corresponding to the group IDs "C0" and "C5," respectively, based on timestamp 208 such that events log 220A includes a time-ordered sequence of network events. Like for events logs 210A-B, graph generator 124 can generate directed graphs 224A-C corresponding to generated events logs 220A-C.

In some embodiments, log generator 120 can generate a plurality of events logs 220A-B corresponding to a plurality of selections of group IDs directly from network-events data 202 without having to generate events logs 210A-B corresponding to individual group IDs. In some embodiments, instead of generating one of directed graphs 224A-C based on a corresponding events log 220A-C, graph generator 124 can be configured to generate a plurality of directed graphs 224A-C by combining two or more of directed graphs 214A-B.

In some embodiments, ID association detector 126 can be configured to calculate a plurality of graph metrics for each of directed graphs 224A-C to calculate a plurality of complexity scores 230A-C corresponding to directed graphs 224A-C, respectively. As described above with respect to FIG. 1, the graph metrics may include, without limitation, a density, a reciprocity, a radius, a diameter, etc. In some embodiments, ID association detector 126 can implement a machine learning algorithm that weighs each of the graph metrics to calculate complexity scores 230A-C. Based on the complexity scores 230A-C, ID association detector 126 may select two or more group IDs 232 (e.g., IDs "C0" and "C5") as being related to the underlying model of computation of CPS 102 to perform the process. In some embodiments, user interface 128 may display to a user (e.g., a system operator) directed graph 224A associated with the two or more selected group IDs 232 to assist the user in understanding and visualizing the model of computation of CPS 102, as derived by CPS logic deriver 116.

Figure 3:
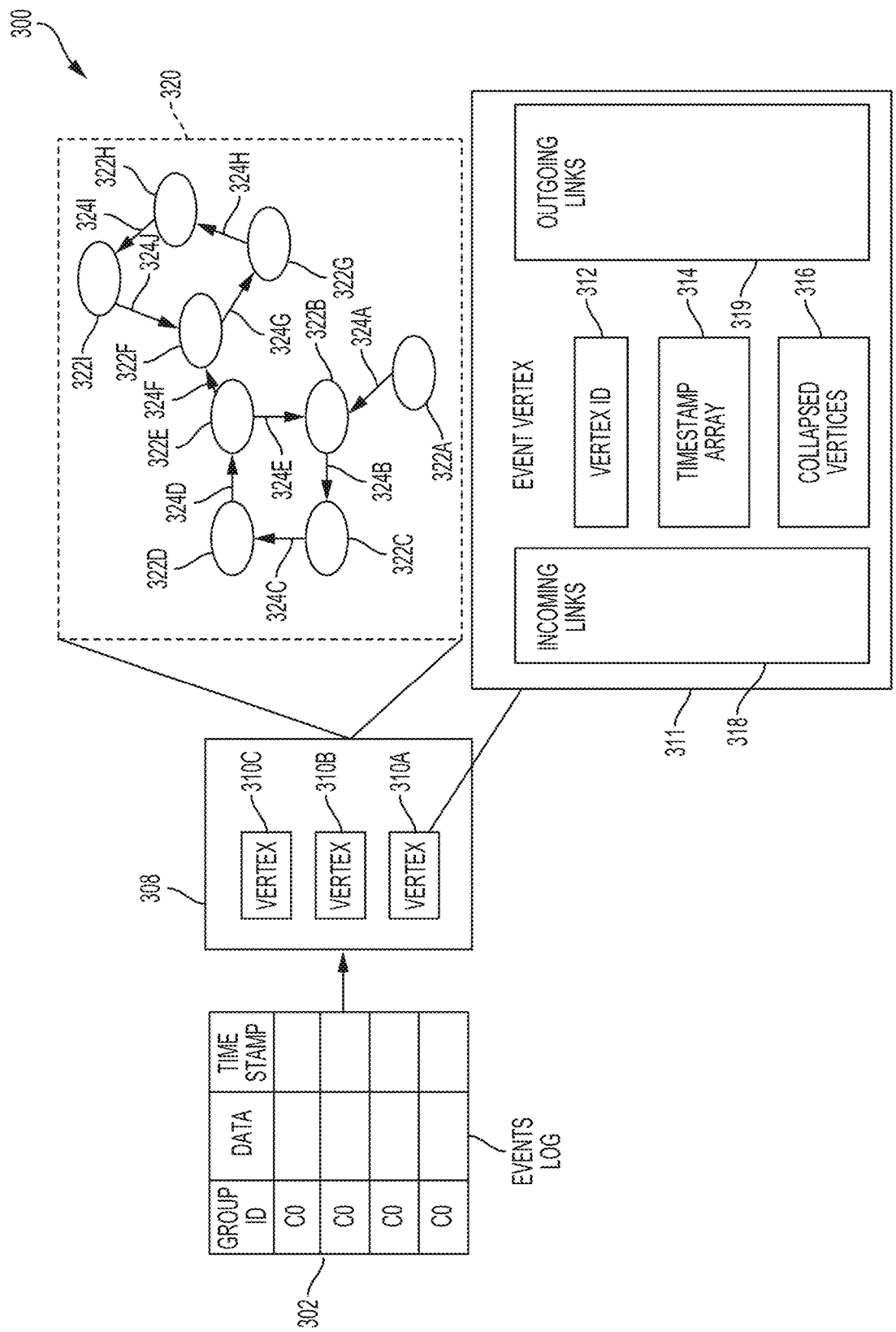
FIG. 3 illustrates a diagram showing how a directed graph can be generated from an events log, according to some embodiments.

FIG. 3 illustrates a diagram 300 showing how a directed graph 320 can be generated from an events log 302, according to some embodiments. For example, events log 302 may be generated by log generator 120, as described with respect to FIG. 1. Events log 302 may include a plurality of network events corresponding to a plurality of network messages transmitted on a CPS network such as CPS network 104 of FIG. 1. In some embodiments, a graph generator, such as graph generator 124 of FIG. 1, can be configured to generate directed graph 320.

In some embodiments, the graph generator can generate graph object 308 based on events log 302 to store a representation of directed graph 320. Graph object 308 can be a data structure for storing vertices 322A-I and directed edges 324A-J of directed graph 320. In some embodiments, graph object 308 can be in the form of an n-by-n adjacency matrix where "n" corresponds to the number of vertices 322A-I in directed graph 320 and an entry in the adjacency matrix is associated with whether a directed edge between two vertices exists in directed graph 320. In some embodiments, as shown in diagram 300, graph object 308 can be in the form of an adjacency list storing a plurality of vertices 310A-C that correspond to vertices 322A-I. In some embodiments, each of vertices 310A-C may be associated with a unique combination of a group ID and a data value of the network events in events log 302.

In some embodiments, each of vertices 310A-C stored in graph object 308 can have the data structure of event vertex 311, as shown in diagram 300. In particular, event vertex 310 can store vertex ID 312, timestamp array 314, collapsed vertices 316, incoming links 318, and outgoing links 319. Vertex ID 312 can be a hashable unique identifier such as a group ID of a network event. Timestamp array 314 can include an array of timestamps for when event vertex 311 was observed in events log 302. Incoming links 318 can include an incoming dataset of event vertex IDs which have an outgoing transition (i.e., a directed edge) to event vertex 311. The incoming dataset can also store a time delta for each event vertex ID representative of the time period between an occurrence of that event vertex ID and an occurrence of the immediately prior event vertex ID. Outgoing links 319 can include an outgoing dataset of event vertex IDs to which event vertex 311 has an outgoing transition (i.e., a directed edge). The outgoing data set can also store a time delta for each event vertex ID representative of the time period between an occurrence of event vertex 311 and that event vertex ID. Collapsed vertices 316 can be a collapsed dataset of vertex IDs which have been collapsed into event vertex 311, as will be further explained below. In some embodiments, the incoming, outgoing, and collapsed datasets may be implemented as separate dictionaries of event vertex IDs.

As shown in diagram 300, directed graph 320 may include a plurality of vertices 322A-I and a plurality of directed edges 324A-J. As described above with respect to FIG. 1, the sequence of network events being visualized in directed graph 320 can include many thousands of network events and results in directed graph 320 that has many vertices and directed edges. As a result, calculating the graph metrics to determine a complexity score for directed graph 320 can be extremely computationally expensive. To reduce these expensive computations, the graph generator can generate a reduced directed graph that is logically equivalent to directed graph 320 by combining redundant vertices, which may be stored in collapsed vertices 316 of each event vertex

311. In some embodiments, the graph generator can combine two or more vertices based on serial equivalency and parallel equivalency.

In some embodiments, to determine a serial or a parallel equivalency between two vertices, the graph generator can determine an indegree (i.e., a number of incoming directed edges) and an outdegree (i.e. a number of outgoing directed edges) of each vertex. In some embodiments, vertex A and vertex B are determined to be in serial equivalence if: an outdegree of A and an indegree of B are both equal to one; and a directed edge from A to B exists. In some embodiments, vertex A and vertex B are determined to be in parallel equivalence if: there exists a directed edge from a vertex C to vertex A, from vertex A to a vertex D, from vertex C to vertex B, and from vertex B to vertex D; and each of outdegree of A, indeegree of A, outdeegree of B, and indegree of B are equal to one. In some embodiments, the graph generator can alternatively determine vertices that are in parallel equivalence or in serial equivalence until no more vertices can be combined.

As described above with respect to FIG. 1, one or more of directed edges 324A-J in directed graph 320 may depict meaningless state transitions between two vertices, which correspond to two types of network events in events log 302. For example, events log 302 may include network events associated with two or more unrelated group IDs. As a result, the specific sub-sequences of network events associated with those two or more group IDs are a result of random chance and unrelated to the underlying model of computation of CPS 102 to perform a specific process.

To identify and delete anomalous directed edges from directed edges 324A-J, the graph generator can track a frequency count for each of directed edges 324A-J during generation of graph object 308 representative of directed graph 320. Then, the graph generator may identify a subset of directed edges 324A-J that are associated with a frequency count below a frequency threshold. For example, directed edge 324F may be identified as one of these low-frequency directed edges. To further determine whether directed edge 324F is anomalous, the graph generator can determine an edge betweenness centrality for directed edge 324F. In diagram 300, the graph generator may determine that directed edge 324F is legitimate upon determining that the edge betweenness centrality exceeds a betweenness threshold. This edge betweenness centrality may indicate directed edge 324F corresponds to underlying transition states in the model of computation of CPS 102. For example, as shown in directed graph 320, directed edge 324F may be a transitioning link between a first cycle of vertices 322B-E and a second cycle of vertices 322F-I.

Figure 4:
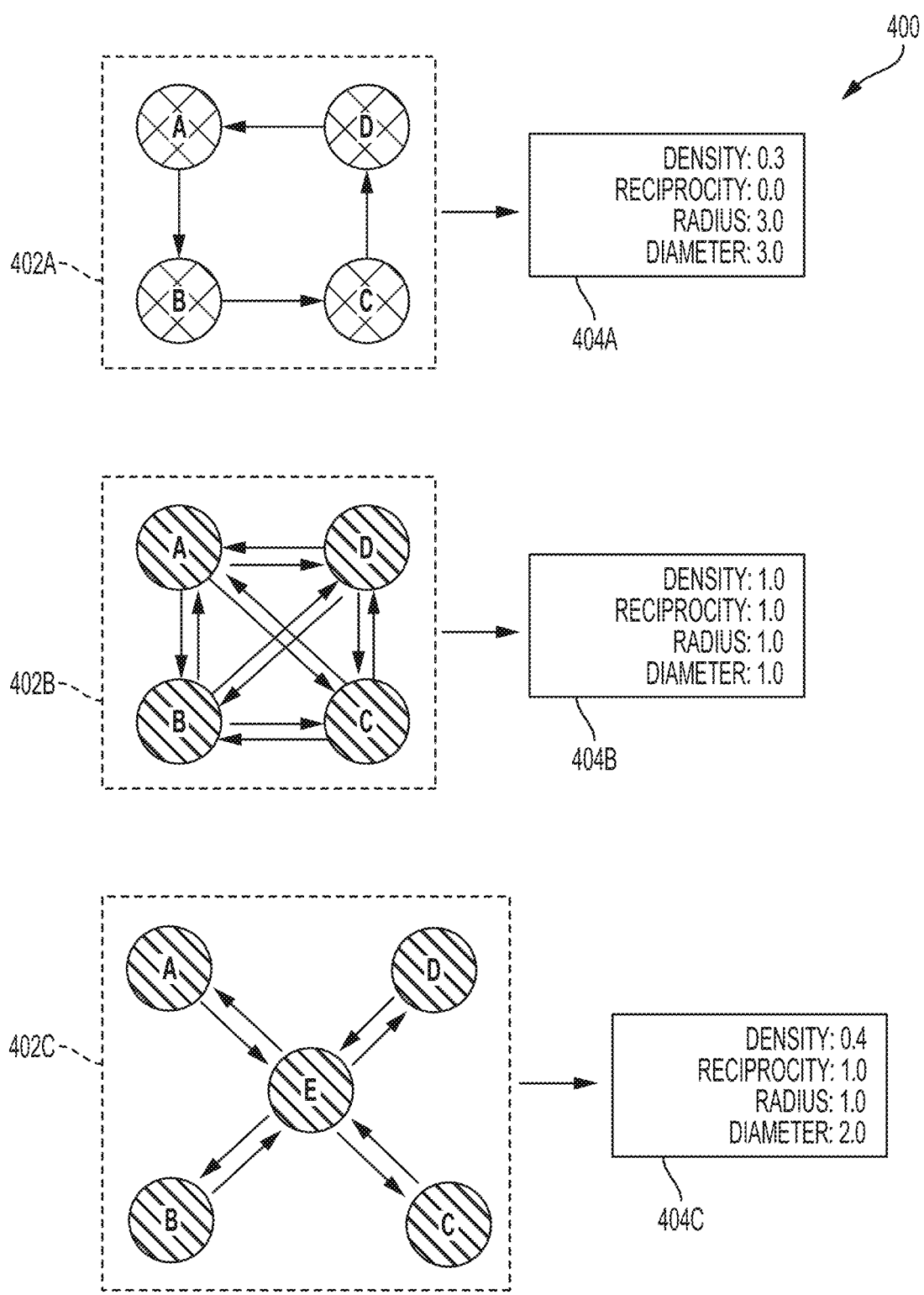
FIG. 4 illustrates a diagram of example directed graphs and associated graph metrics, according to some embodiments.

FIG. 4 illustrates a diagram 400 of example directed graphs 402A-C and associated graph metrics 404A-C, according to some embodiments. As described above, graph metrics 404A-C can be used to quantify a complexity of directed graphs 402A-C and may include, without limitation, a density metric, a reciprocity metric, a radius metric, or a diameter metric.

A lower density metric for the directed graph may be an indication of more ordered data and a less "complex" graph. For example, for directed graph 402C, the density of 0.4 may be calculated by dividing the 8 directed edges in directed graph 402C by the 20 total possible number of directed edges. Similarly, the densities for directed graphs 402A and 402B may be calculated as 0.3 and 1.0, respectively. As shown in diagram 400, directed graph 402A has the lowest density, which is indicative of its highly ordered vertices and may be an indication that the group IDs corresponding to the vertices are related.

A lower reciprocity metric for the directed graph may be an indication of more ordered data and a less "complex" graph. For example, for directed graph 402C, the reciprocity of 1.0 may be calculated by calculating the percentage or ratio of directed edges between two vertices being reciprocated. Similarly, the reciprocity for directed graphs 402A and 402B may be calculated as 0.0 and 1.0, respectively. The reciprocity for directed graph 402A is 0 because no directed edge between two vertices in directed graph 402 is reciprocated. As shown in diagram 400, directed graph 402A has the lowest reciprocity, which is indicative of its highly ordered vertices and may be an indication that the group IDs corresponding to the vertices are related.

A higher radius or diameter metric for the directed graph may be an indication of more ordered data and a less "complex" graph. The radius and diameter corresponds to a minimum and a maximum graph eccentricity, respectively, of the directed graph where an eccentricity for a vertex is defined as the maximum graph distance between that vertex and any other vertex in the directed graph. For example, for directed graph 402C, the eccentricities for vertices A, B, C, D, and E are 2, 2, 2, 2, and 1, respectively. The eccentricity for vertex A is 2 because the maximum distance between vertex A and any other vertex is 2 (e.g., between vertices A and C). In contrast, the eccentricity for vertex E is 1 because the maximum distance between vertex E and any other vertex is 1 (e.g., between vertices E and C). Based on the vertices eccentricities, the radius for directed graph 402C is 1 and the diameter for directed graph 402C is 2. Similarly, the radiuses for directed graphs 402A and 402B may be calculated as 3 and 1, respectively. Similarly, the diameters for directed graphs 402A and 402B may be calculated as 3 and 1, respectively. As shown in diagram 400, directed graph 402A has the highest radius and the highest diameter, each of which is indicative of its highly ordered vertices and may be an indication that the group IDs corresponding to the vertices are related.

Figure 5:
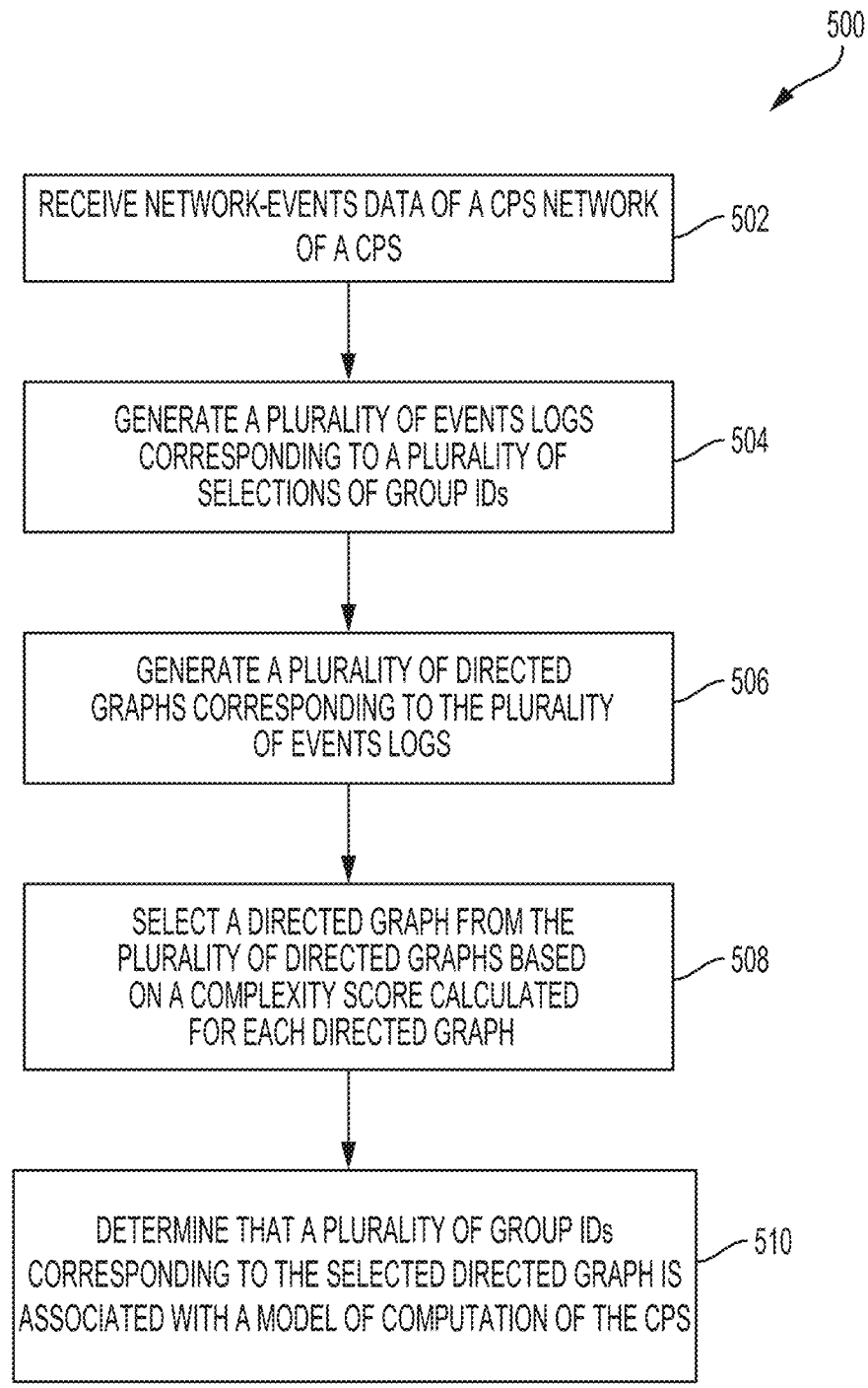
FIG. 5 illustrates a method for deriving a model of computation of the CPS, according to some embodiments.

FIG. 5 illustrates a method 500 for deriving a model of computation of a CPS, according to some embodiments. Method 500 can be performed by a CPS logic deriver such as CPS logic deriver 116, as described with respect to FIG. 1. Accordingly, one or more of the steps below may reference the components of CPS logic deriver 116. Method 500 can be performed by a computing system with one or more processors and a memory (e.g., the computing system 700 illustrated in FIG. 7). Method 500 may be included in one or more programs stored in the memory that, when executed by the one or more processors, cause the one or more processors to perform method 500.

In step 502, a log generator (e.g., log generator 120) of the CPS logic deriver receives network-events data of a CPS network of the CPS. In some embodiments, the network-events data can be generated and transmitted by a CPS network monitor (CPS network monitor 112) configured to monitor network traffic of the CPS network. In some embodiments, the network-events data includes a plurality of network events and associated group IDs. In some embodiments, the CPS network implements a multi-master message-based communication protocol, which does not specify device addresses or IDs in network messages.

In step 504, the log generator generates a plurality of events logs corresponding to a plurality of selections of group IDs from the group IDs in the network-events data. In some embodiments, each selection includes two or more unique group IDs. In some embodiments, each events log includes a sequence of network events selected from the network-events data based on the selection of group IDs corresponding to that events log.

In step 506, a graph generator (e.g., graph generator 124) of the CPS logic deriver generates a plurality of directed graphs corresponding to the plurality of events logs. In some embodiments, each directed graph is generated based on the sequence of network events in the events log, as will be further described with respect to FIG. 6.

In step 508, an ID association detector (e.g., ID association detector 126) of the CPS logic deriver selects a directed graph from the plurality of directed graphs based on a complexity score calculated for each directed graph. In some embodiments, the ID association detector can calculate the complexity score based on a plurality of graph metrics calculated for each directed graph.

In step 510, the ID association detector determines that a plurality of group IDs corresponding to the selected directed graph is associated with the model of computation of the CPS to perform the process. In some embodiments, a user interface (e.g., user interface 128) of the CPS logic deriver can provide a visualization of the directed graph—showing relationships between the plurality of group IDs—to a user (e.g., a system operator) to enable the user to better understand the model of computation of the CPS, as derived by the CPS logic deriver.

In some embodiments, the CPS logic deriver can be a component of a security system for monitoring the CPS or be coupled to such a security system. The security system may be configured to detect and analyze behavior patterns of the CPS as well as detect potential malwares, network intrusions, or system vulnerabilities. By providing the directed graph, representative of a model of computation for the CPS executing a process, the CPS logic deriver may enable the security system to determine whether the CPS is behaving anomalously and/or whether the CPS has been compromised.

Figure 6:
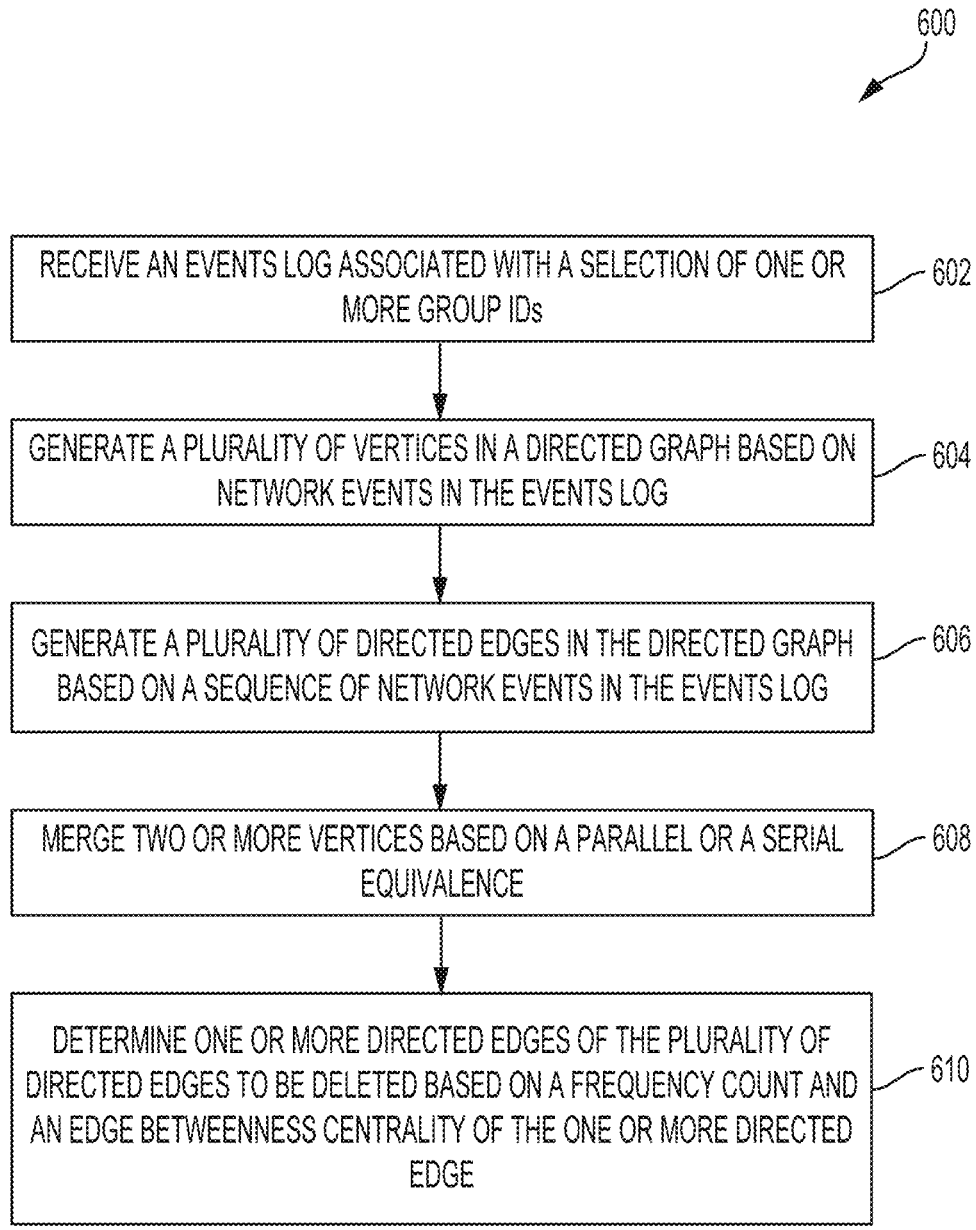
FIG. 6 illustrates a method for generating a directed graph from an events log to derive a model of computation of the CPS, according to some embodiments.

FIG. 6 illustrates a method 600 for generating a directed graph from an events log to derive a model of computation of a CPS, according to some embodiments. Method 600 can be performed by a CPS logic deriver such as CPS logic deriver 116, as described with respect to FIG. 1. Accordingly, one or more of the steps below may reference the components of CPS logic deriver 116. Method 600 can be performed by a computing system with one or more processors and a memory (e.g., the computing system 700 illustrated in FIG. 7). Method 600 may be included in one or more programs stored in the memory that, when executed by the one or more processors, cause the one or more processors to perform method 500.

In step 602, a graph generator (e.g., graph generator 124) of the CPS logic deriver receives an events log associated with a selection of one or more group IDs. In some embodiments, the selection includes two or more group IDs. In some embodiments, the events log includes a sequence of network events, as shown and described above with respect to FIGS. 2 and 3.

In step 604, the graph generator generates a plurality of vertices in a directed graph based on network events in the events log. In some embodiments, each vertex may correspond to a network event in the events log. In some embodiments, each vertex may correspond to a type of network events associated a group ID and a data value.

In step 606, the graph generator generates a plurality of directed edges in a directed graph based on the sequence of network events in the events log. As described with respect to FIG. 3, a directed edge between a first vertex and a second vertex in the directed graph may correspond to a second type of network event being adjacent to and following a first type of network event in the sequence of network events. For example, a directed edge between two vertices may correspond to two adjacent network events in the sequence of network events. In some embodiments, for each of the directed edges, the graph generator can track a frequency count representative of the number of occurrences of the directed edge detected in the network-events log.

In step 608, the graph generator merges two or more vertices based on a parallel or a serial equivalence. In some embodiments, the graph generator can determine whether two vertices are in serial equivalence or in parallel equivalence based on an indegree and an outdegree calculated for each of the two vertices, as described above with respect to FIG. 3. In some embodiments, the graph generator can be configured to vertices by determining parallel and serial equivalences until no more parallel or serial equivalences can be found.

In step 610, the graph generator determines one or more directed edges of the plurality of directed edges to be deleted from the directed graph based on a frequency count and an edge betweenness centrality of the one or more directed edges. In some embodiments, the graph generator selects a subset of the plurality of directed edges based on determining that the frequency count for a directed edge in the subset falls below a frequency threshold. In some embodiments, the graph generator can calculate the edge between centrality for each directed edge in the subset to determine the one or more directed edges having an edge betweenness centrality that falls below a betweenness threshold. The graph generator can delete these one or more determined directed edges from the directed graph to remove anomalous directed edges that are unrelated to the model of computation of the CPS.

Figure 7:
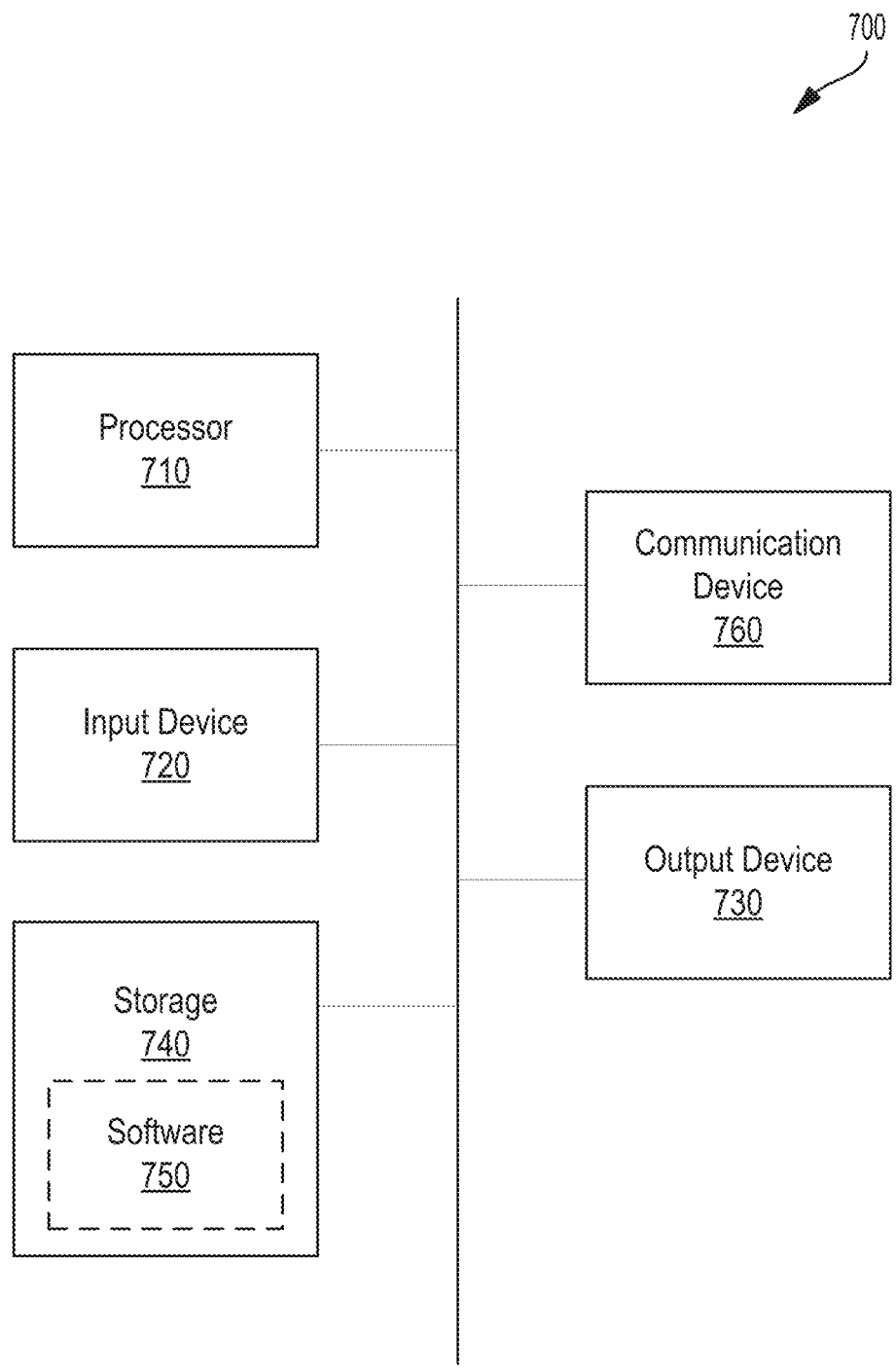
FIG. 7 illustrates an example of a computing device, according to some embodiments.

FIG. 7 illustrates an example of a computer in accordance with one embodiment. Computer 700 can be a component of a system for deriving a model of computation of a CPS according to the systems and methods described above, such as system 100 of FIG. 1, or can include the entire system itself. In some embodiments, computer 700 is configured to execute a method for deriving the model of computation or generating a directed graph, such as methods 500 and 600 of FIGS. 5 and 6, respectively.

Computer 700 can be a host computer connected to a network. Computer 700 can be a client computer or a server. As shown in FIG. 7, computer 700 can be any suitable type of microprocessor-based device, such as a personal computer, workstation, server, or handheld computing device, such as a phone or tablet. The computer can include, for example, one or more of processor 710, input device 720, output device 730, storage 740, and communication device 760. Input device 720 and output device 730 can correspond to those described above and can either be connectable or integrated with the computer.

Input device 720 can be any suitable device that provides input, such as a touch screen or monitor, keyboard, mouse, or voice-recognition device. Output device 730 can be any suitable device that provides an output, such as a touch screen, monitor, printer, disk drive, or speaker.

Storage 740 can be any suitable device that provides storage, such as an electrical, magnetic, or optical memory, including a random access memory (RAM), cache, hard drive, CD-ROM drive, tape drive, or removable storage disk. Communication device 760 can include any suitable device capable of transmitting and receiving signals over a network, such as a network interface chip or card. The components of the computer can be connected in any suitable manner, such as via a physical bus or wirelessly. Storage 740 can be a non-transitory computer-readable storage medium comprising one or more programs, which, when executed by one or more processors, such as processor 710, cause the one or more processors to execute methods described herein, such as methods 500 and 600 of FIGS. 5 and 6, respectively.

Software 750, which can be stored in storage 740 and executed by processor 710, can include, for example, the programming that embodies the functionality of the present disclosure (e.g., as embodied in the systems, computers, servers, and/or devices as described above). In some embodiments, software 750 can include a combination of servers such as application servers and database servers.

Software 750 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device with a display, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method for deriving a model of computation of a cyber-physical system (CPS), comprising:
   receiving network-events data corresponding to a CPS network while the CPS is performing a process of interest, wherein the network-events data comprises a plurality of network events and associated group IDs;
   generating a plurality of events logs corresponding to a plurality of selections of two or more unique group IDs from the group IDs, wherein each events log comprises a sequence of network events selected from the plurality of network events based on the selection of two or more group IDs for the events log;
   generating a plurality of directed graphs corresponding to the plurality of events logs, wherein each directed graph generated for an events log represents the sequence of network events for the selection of two or more unique group IDs associated with the events log;
   selecting a directed graph from the plurality of directed graphs based on a score for a graph complexity calculated for each directed graph; and
   determining that the model of computation of the CPS to perform the process of interest includes two or more unique group IDs whose sequence of network events are represented in the selected directed graph.

2. The method of claim 1, wherein selecting the directed graph comprises selecting the directed graph having a lowest score representing a least graph complexity.

3. The method of claim 1, wherein a network event includes a group ID that specifies a data type of a network message in the network event.

4. The method of claim 1, wherein a group ID associated with a network event specifies a priority level of the network event.

5. The method of claim 1, wherein the CPS network is configured to implement a control network protocol in which subsets of network traffic are associated with respective, different types of data, each of which can be identified by a group identifier (ID).

6. The method of claim 1, wherein the network events associated with the same group ID indicates that the network events belong to a common group or process.

7. The method of claim 1, comprising:
   providing a visualization of the selected directed graph to a user, wherein the directed graph represents the model of computation implemented by the CPS to perform the process of interest.

8. The method of claim 1, comprising:
   monitoring the CPS network to receive the network-events data.

9. The method of claim 1, wherein generating the directed graph based on the sequence of network events in the events log comprises:
   generating a plurality of vertices in the directed graph, wherein the plurality of vertices correspond to the network events in the events log; and
   generating a plurality of directed edges in the directed graph based on the sequence of network events, wherein a directed edge between two vertices corresponds to two adjacent network events in the sequence of network events.

10. The method of claim 9, comprising:
    determining a frequency count for each directed edge of the plurality of directed edges based on the sequence of network events;
    selecting a subset of the directed edges from the plurality of directed edges based on the frequency count for a directed edge falling below a frequency threshold;
    calculating an edge betweenness centrality for each directed edge from the subset of directed edges; and
    deleting a directed edge of the subset of directed edges from the directed graph upon determining that the edge betweenness centrality for the directed edge falls below a betweenness threshold.

11. The method of claim 9, wherein generating the directed graph based on the sequence of network events in the events log comprises:
    merging two or more vertices in the directed graph based on a parallel or a serial equivalence of the two or more vertices to generate a reduced directed graph for the events log.

12. The method of claim 1, wherein the score for the graph complexity of a directed graph is calculated based on a plurality of graph metrics of the directed graph.

13. The method of claim 12, wherein the plurality of graph metrics comprises a density, a reciprocity, a radius, or a diameter.

14. The method of claim 12, wherein the plurality of graph metrics comprises a density, a reciprocity, a radius, and a diameter.

15. A system for deriving a model of computation of a cyber-physical system (CPS), comprising:
    one or more processors and memory storing one or more programs that when executed by the one or more processors cause the one or more processors to:
    receive network-events data corresponding to a CPS network while the CPS is performing a process of interest, wherein the network-events data comprises a plurality of network events and associated group IDs;
    generate a plurality of events logs corresponding to a plurality of selections of two or more unique group IDs from the group IDs, wherein each events log comprises a sequence of network events selected from the plurality of network events based on the selection of two or more group IDs for the events log;
    generate a plurality of directed graphs corresponding to the plurality of events logs, wherein each directed graph generated for an events log represents the sequence of network events for the selection of two or more unique group IDs associated with the events log;
    select a directed graph from the plurality of directed graphs based on a score for a graph complexity calculated for each directed graph; and
    determine that the model of computation of the CPS to perform the process of interest includes two or more unique group IDs whose sequence of network events are represented in the selected directed graph.

16. The system of claim 15, to select the directed graph, the one or more processors are caused to select the directed graph having a lowest score representing a least graph complexity.

17. The system of claim 15, wherein a network event includes a group ID that specifies a data type of a network message in the network event.

18. The system of claim 15, wherein a group ID associated with a network event specifies a priority level of the network event.

19. The system of claim 15, wherein the CPS network is configured to implement a control network protocol in which subsets of network traffic are associated with respective, different types of data, each of which can be identified by a group identifier (ID).

20. The system of claim 15, wherein the network events associated with the same group ID indicates that the network events belong to a common group or process.

21. The system of claim 15, wherein the one or more processors are caused to:
provide a visualization of the selected directed graph to a user, wherein the directed graph represents the model of computation implemented by the CPS to perform the process of interest.

22. The system of claim 15, wherein the one or more processors are caused to:
monitor the CPS network to receive the network-events data.

23. The system of claim 15, wherein to generate the directed graph based on the sequence of network events in the events log the one or more processors are caused to:
generate a plurality of vertices in the directed graph, wherein the plurality of vertices correspond to the network events in the events log; and
generate a plurality of directed edges in the directed graph based on the sequence of network events, wherein a directed edge between two vertices corresponds to two adjacent network events in the sequence of network events.

24. The system of claim 23, wherein the one or more processors are caused to:
determine a frequency count for each directed edge of the plurality of directed edges based on the sequence of network events;
select a subset of the directed edges from the plurality of directed edges based on the frequency count for a directed edge falling below a frequency threshold;
calculating an edge betweenness centrality for each directed edge from the subset of directed edges; and
deleting a directed edge of the subset of directed edges from the directed graph upon determining that the edge betweenness centrality for the directed edge falls below a betweenness threshold.

25. The system of claim 23, wherein to generate the directed graph based on the sequence of network events in the events log, the one or more processors are caused to:
merging two or more vertices in the directed graph based on a parallel or a serial equivalence of the two or more vertices to generate a reduced directed graph for the events log.

26. The system of claim 15, wherein the score for the graph complexity of a directed graph is calculated based on a plurality of graph metrics of the directed graph.

27. The system of claim 26, wherein the plurality of graph metrics comprises a density, a reciprocity, a radius, or a diameter.

28. The system of claim 26, wherein the plurality of graph metrics comprises a density, a reciprocity, a radius, and a diameter.

29. A non-transitory computer-readable storage medium comprising instructions for deriving a model of computation of a cyber-physical system (CPS), wherein the instructions, when executed by one or more processors, cause the one or more processors to perform instructions comprising:
receiving network-events data corresponding to a CPS network while the CPS is performing a process of interest, wherein the network-events data comprises a plurality of network events and associated group IDs;
generating a plurality of events logs corresponding to a plurality of selections of two or more unique group IDs from the group IDs, wherein each events log comprises a sequence of network events selected from the plurality of network events based on the selection of two or more group IDs for the events log;
generating a plurality of directed graphs corresponding to the plurality of events logs, wherein each directed graph generated for an events log represents the sequence of network events for the selection of two or more unique group IDs associated with the events log;
selecting a directed graph from the plurality of directed graphs based on a score for a graph complexity calculated for each directed graph; and
determining that the model of computation of the CPS to perform the process of interest includes two or more unique group IDs whose sequence of network events are represented in the selected directed graph.

* * * * *